Oct. 30, 1962

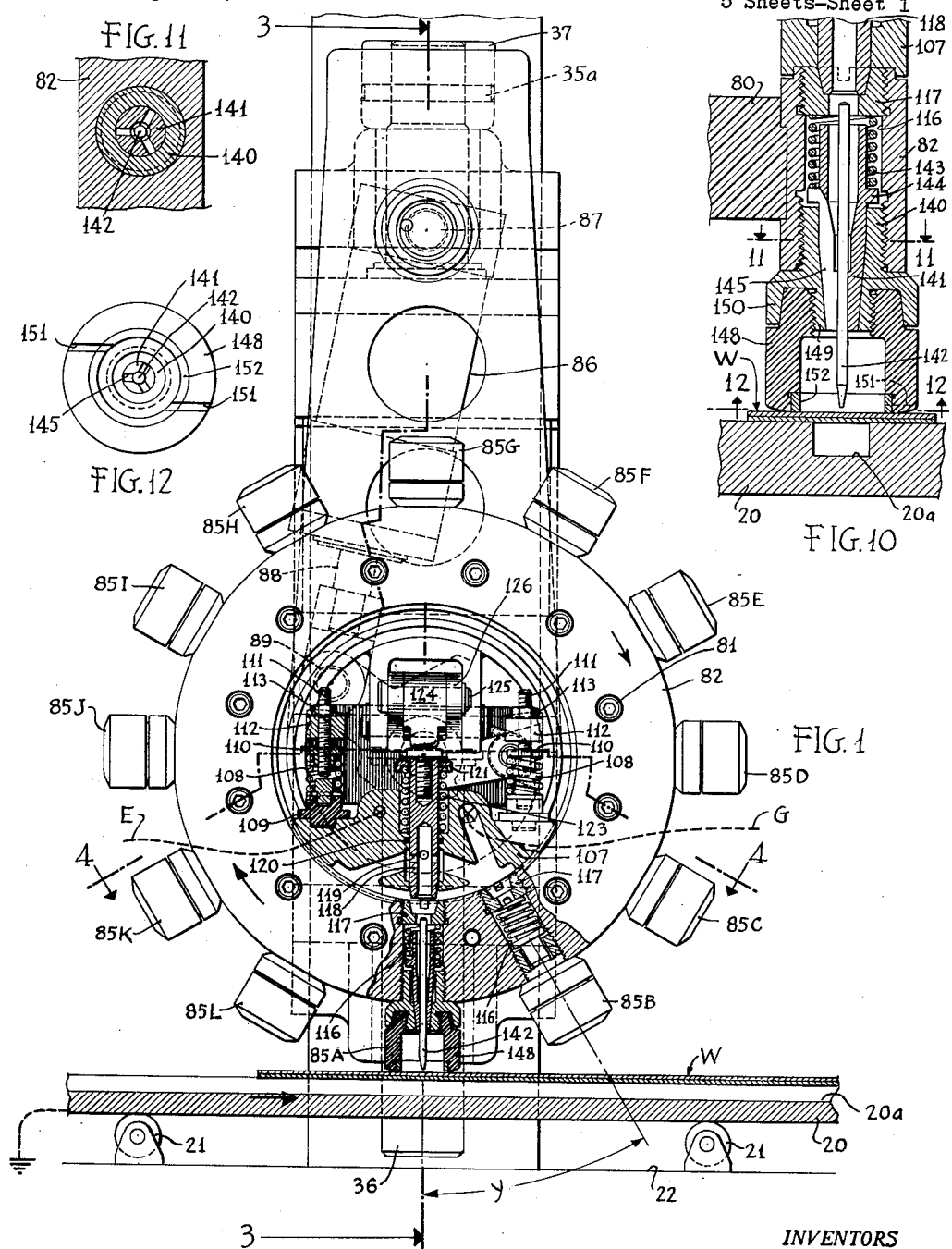

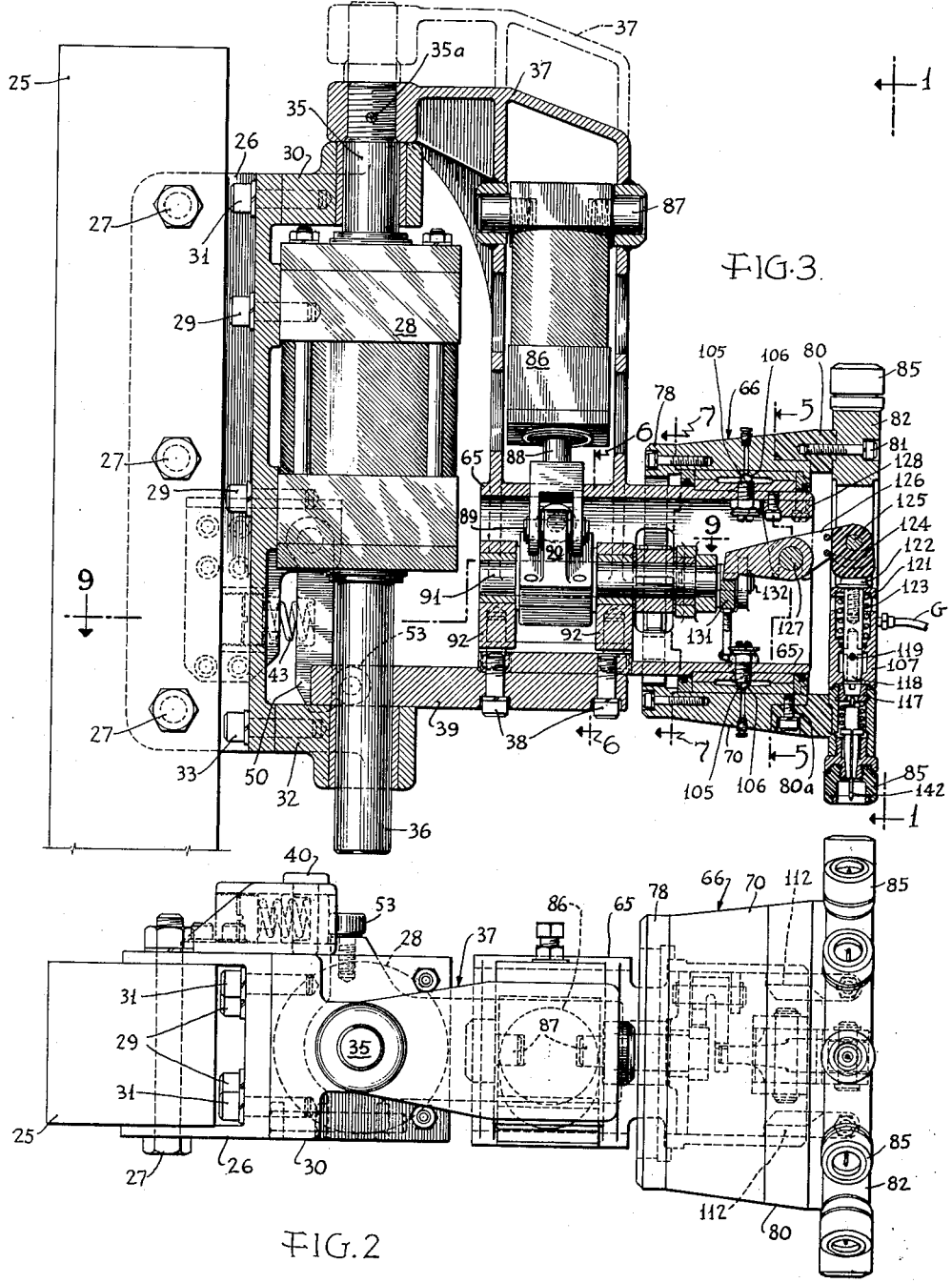

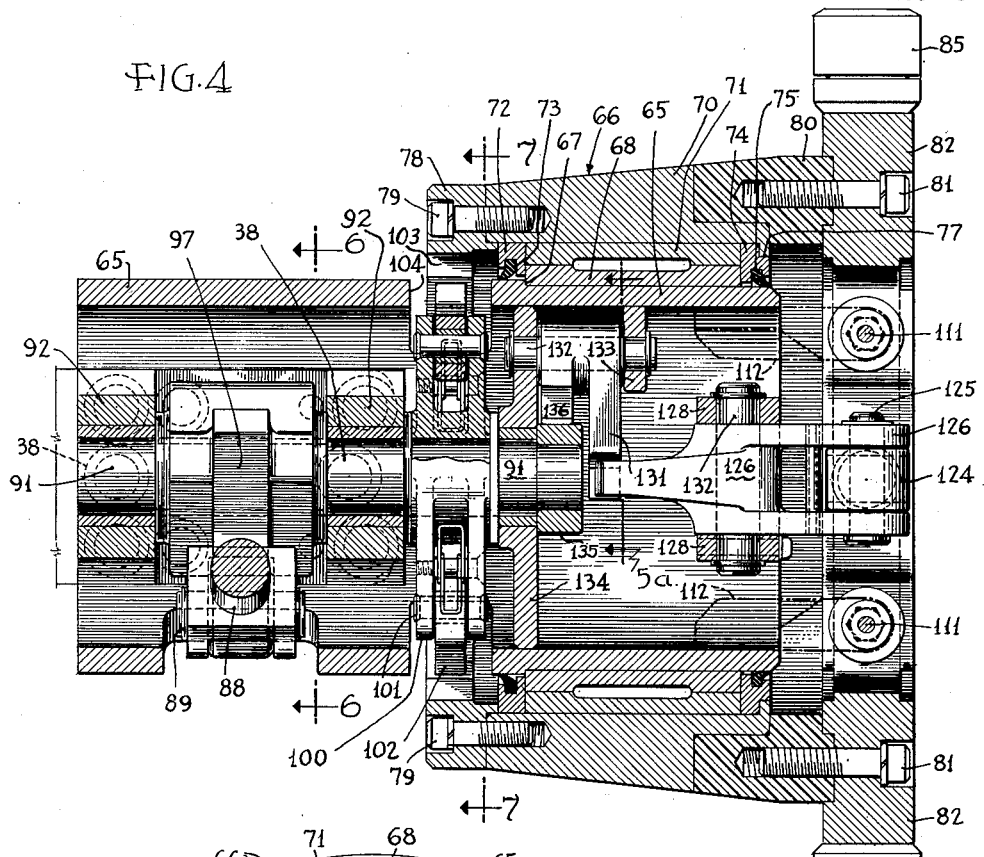
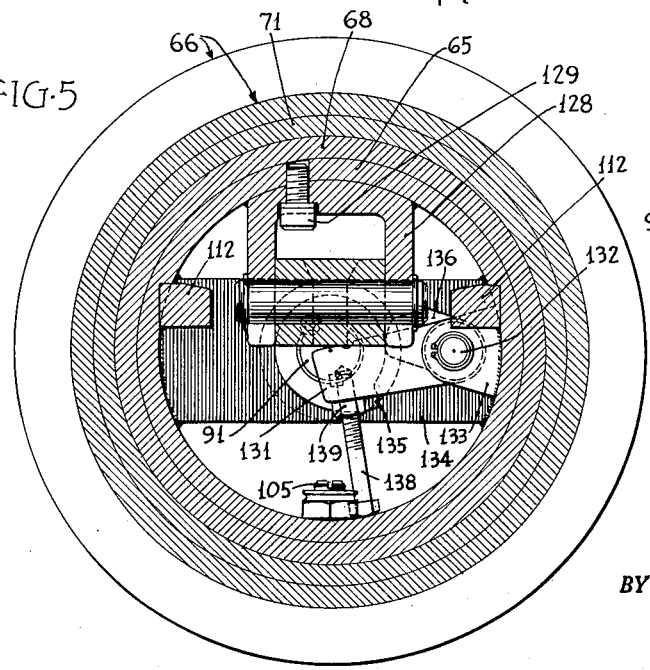
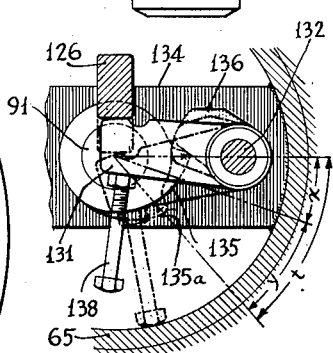

H. D. VAN SCIVER II, ET AL 3,061,714

ARC SPOT WELDING APPARATUS

Filed Sept. 23, 1960

INVENTORS
HERBERT D. VANSCIVER II
LESTER T. BOWERS
ALBERT J. BENDE
RAYMOND E. BUREAU

BY Wm. R. Glisson

ATTORNEY

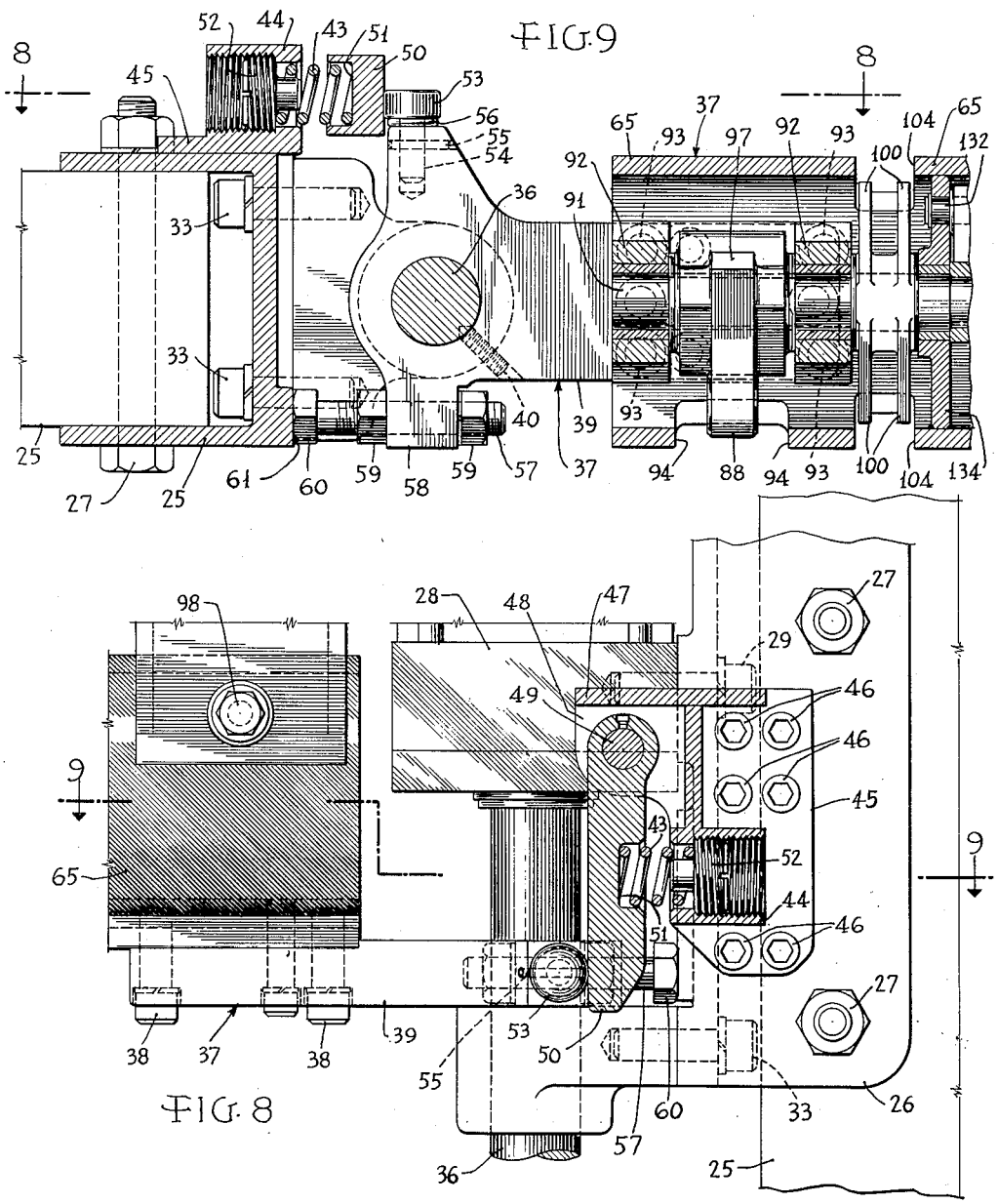

United States Patent Office 3,061,714
Patented Oct. 30, 1962

3,061,714
ARC SPOT WELDING APPARATUS
Herbert D. Van Sciver II, Merion, and Raymond E. Bureau, Hendricks, Pa., Albert J. Bende, Haddon Heights, N.J., and Lester T. Bowers, Oreland, Pa., assignors to The Budd Company, Philadelphia, Pa., a corporation of Pennsylvania
Filed Sept. 23, 1960, Ser. No. 57,962
13 Claims. (Cl. 219—127)

This invention relates to arc spot welding apparatus and method and has for an object the provision of improvements in this art.

The type of welding here concerned is often referred to as TIG welding, meaning tungsten electrode and inert gas protection.

One of the particular objects of the invention is to provide a plurality of electrodes and means for successively bringing different electrodes into action whereby to make better welds and to lengthen the life of the electrodes.

Another object is to provide means for making successive welds on a moving workpiece.

Another object is to connect successive electrodes with a supply of protecting gas.

Another object is to provide means for holding an electrode in proper position and allowing it to be reset as required.

Another object is to provide means for supporting the workpiece in a manner to avoid undue heat transfer from the welding zone and provide protection for the back of the workpiece.

Another object is to provide apparatus which facilitates dressing and adjusting electrodes without removing them from the machine; or for permitting their ready removal and replacement if desired.

The above and other objects and advantages of the invention will be apparent from the following description of an exemplary embodiment, reference being made to the accompanying drawings, wherein:

FIG. 1 is a front elevation on the line 1—1 of FIG. 3 partly in section, of one form of apparatus embodying the invention;

FIG. 2 is a top plan view on a reduced scale of the apparatus shown in FIG. 1;

FIG. 3 is a vertical section on a reduced scale taken on the line 3—3 of FIG. 1;

FIG. 4 is a generally horizontal enlarged section taken on the line 4—4 of FIG. 1;

FIG. 5 is an enlarged vertical section taken on the line 5—5 of FIG. 3;

FIG. 5a is a partial vertical section taken on the line 5a—5a of FIG. 4;

FIG. 8 is an enlarged partial vertical elevation, as seen from the upper left side of FIG. 2, partly in section on the line 8—8 of FIG. 9;

FIG. 9 is an enlarged partial horizontal section, about on the line 9—9 of FIG. 3, and on the line 9—9 of FIG. 8;

FIG. 10 is an enlarged section of an electrode unit shown in FIG. 1;

FIG. 11 is a section taken on the line 11—11 of FIG. 10; and

FIG. 12 is a bottom plan view taken on the line 12—12 of FIG. 10.

Figure 6:
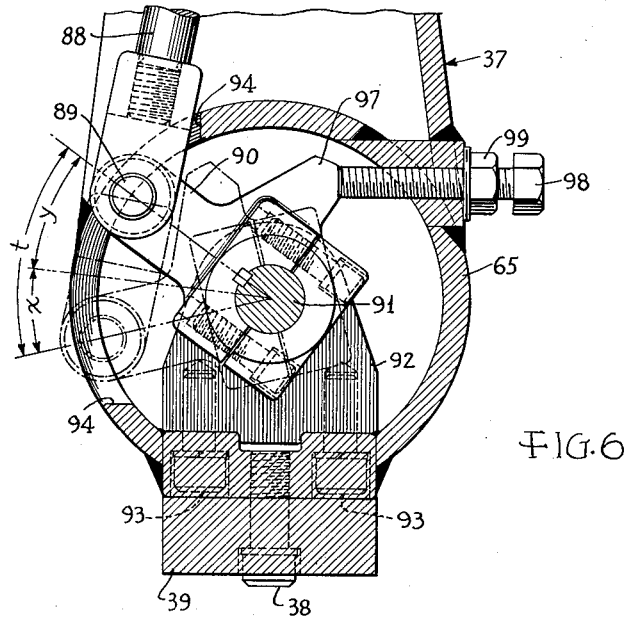
FIG. 6 is a vertical section taken on the line 6—6 of FIG. 4.

The apparatus includes a work table 20 carrying a workpiece W comprising two or more sheets of material to be welded together. Here it is indicated that the table 20 moves on rolls 21 carried by a fixed table support 22. The rate of travel of the table is adjusted by means, not shown, to vary the spacing of the welds. The welding equipment is designed for a constant rate of travel of the table and workpiece for a selected weld spacing so it will be assumed that means, not shown, are provided for producing the constant movement of the table at the rate of travel selected.

It will be noted in FIGS. 1 and 10 that the table directly at the weld line is provided with a narrow groove 20a to avoid chilling the workpiece at the weld. This is useful for some classes of work. Another use of the groove is to serve as a duct for holding a protective gas below the workpiece, the gas being introduced by any suitable means, to protect the under side of the workpiece from oxidation or other contamination when heated during welding.

The welding machine itself comprises a plurality of welding electrodes with protective hoods, means to bring the electrodes successively into position for making a weld, means for producing relative movement between an electrode and workpiece during welding, and means for supplying high frequency starting (or teasing) current (frequency up to radio range), welding current (200–300 amp.) and a protective gas (argon, etc.) during welding.

In the present apparatus the welding time is intended to be brief (down to 5 cycles or less) of 60 cycle current for making welds in thin sheet material and at most about 60 cycles for thicker sheets and the relative transverse travel between workpiece and electrode will be very small while a weld is being made, hence if the workpiece is moving linearly the electrode can follow along an arcuate path and its transverse component of movement during the making of a weld will be so small as to be negligible. Apparatus for providing arcuate movement can be much simpler and less expensive than apparatus for producing linear movement of the electrode with the workpiece during welding. By working on an arc on both sides of the point of tangency and providing a relatively large radius of movement the travel is almost a straight line.

The welder comprises a fixed support 25 which is secured alongside the table support 22. A frame 26 is secured to the support 25, as by bolts 27, and the frame has attached to it a power lift cylinder 28, as by cap bolts 29, an upper guide 30, as by cap bolts 31, and a lower guide 32, as by cap bolts 33.

A piston (not shown) operates within the cylinder 28 and is provided with an upper piston rod 35 and a lower piston rod 36. The upper piston rod 35 slides and turns in the upper guide 30 and the lower piston rod 36 slides and turns in the lower guide 32.

To the upper piston rod 35 there is secured, as by being threaded thereon and held by a drive pin 35a, a lift frame 37. The frame 37 at the bottom has secured thereto, as by cap bolts 38, a lower portion 39 which is carried by the lower piston rod 36. A close fit is sufficient here, since the portion 39 is only a brace carried by the lower piston rod; but the portion 39 may be secured to the piston rod if desired, as by a set screw 40.

The frame 37, besides moving up and down with the piston and piston rods 35, 36, has a turning movement with the piston rods and piston relative to the cylinder 28 and the frame 26. This turning movement is produced by the engagement of an electrode unit with the moving workpiece and is opposed by a spring 43 (FIGS. 8 and 9) carried in a barrel 44 of a bracket 45 made fast on the fixed frame 26, as by cap bolts 46. The bracket 45 carries (as by having welded thereto) a secondary bracket 47 having side plates 48 which support a hinge pin 49 of a cam bar 50. The cam bar 50 has a socket 51 which seats the outer end of the spring 43. The tension of the spring 43 is adjusted by a screw 52 threaded in the barrel 44. A cam follower 53 carried by the lift frame 37 cooperates with the outer surface of the cam bar 50, the cam follower here being shown as a screw 54 threaded in the lift frame 37 and held by a drive pin 55. The head of the screw 54 acts as the cam follower. A space-filling washer 56, as of rubber, is secured beneath the follower screw head 53. The return position of the lift frame 37 is accurately located by an adjustable stop bolt 57 threaded in a flange 58 of the frame 37 and held in adjusted position by lock nuts 59. The head 60 of the stop bolt 57 engages a hardened slide surface 61 on the fixed frame 26.

From the above description it will be seen that the frame 37 is moved up and down between welds by the power lift device 38 etc. and turns a certain distance as welds are being made, being returned after welding by the spring 43. While the frame 37 is raised the electrodes are shifted to move one electrode unit to an inactive position and to move another electrode unit into active position ready to make another weld. It has been found that electrodes and the electrode units have a very much longer life (at least five times as great) when interchanged between welds in this way. The mounting for the electrode units and the means for supplying them with inert gas, welding current and starting current will now be described.

The lift frame 37 includes a tubular member 65, shown as being welded thereto, on which there is rotatably mounted an electrode head 66. The outer end of the tubular member is reduced in diameter from the outer end and provided with a stop shoulder 67. A retainer sleeve 68 is pushed on the outer end until it engages the shoulder 67. The retainer sleeve may be held in position, as by force-fitting, set screws, or other means.

The electrode head 66 includes a tubular member 70 which is rotatably mounted on the tubular member 65 of the lift frame 37. An inner bearing liner 71 thereof turnably fits on the retainer sleeve 68 and is held in position thereon by an inner sealing ring 72, having an annular sealing strip 73, and an outer sealing ring 74, having an annular sealing strip 75.

For holding the sealing rings 72 and 74, an outer retaining flange 77 is formed on the tubular member 70 and an inner retaining ring 78 is secured to the member 70, as by cap screws 79.

An outer ring 80 of insulating material is secured on the end of the tubular member 70, as by set screws 80a and to this ring 80 there is secured, as by cap bolts 81, an electrode mounting head ring 82.

The mounting ring 82 carries a plurality of electrode units 85, the number here shown being twelve and designated counterclockwise as 85A to 85L.

The electrode head turning means shown herein includes a power device comprising a cylinder 86 mounted on trunnions 87 on the frame 37 and a piston (not shown) in the cylinder having a piston rod 88 connected by a crank pin 89 to the crank arm 90 of an indexing shaft 91. The shaft 91 is mounted in bearings carried by bearing brackets 92 secured in the frame 37, as by cap bolts 93. The tubular member 65 is cut away, as at 94 to clear the joint of the piston rod with the crank arm.

It is arranged that on the up-stroke of the piston rod the indexing shaft 91 will be stopped in a definite position to bring an electrode unit into approximately correct position and that on the downstroke the shaft will have overtravel to operate a detent to accurately place the head ring in final position and lock it there. The means for setting and adjusting the shaft movement on the upstroke comprises a stop arm 97, carried by the shaft 91 (shown as integral with crank arm 90), which engages an adjustable stop screw 98 threaded in the member 65 and a locknut 99 to hold the screw in adjusted position.

Outward axially of the crank arm 90 and stop arm 97 the shaft 91 carries fast thereon ratchet arms 100 each having pivoted thereon, as by a pivot pin 101, a ratchet pawl 102. The ratchet pawls 102 coact with a ratchet gear 103 formed within the retaining flange 77. The pawls 102 are pressed outward by springs 102a. The tubular member 65 is cut away on the sides, as at 104, to clear the pawls 102. Ball spring detents 105 and ball recesses 106 for each electrode unit position are provided for halting the turning movement near the correct position and preventing overtravel.

Means are provided for supplying a protective gas, welding current, and starting or teasing current to the electrode units on the electrode ring 82 as the electrode units come into position for welding. The means herein shown comprises an arcuate grooved manifold sector 107 which rides on the bottom part of the inner surface of the ring 82 and is kept resiliently pressed thereagainst to maintain good electrical contact therewith. The means shown for exerting this pressure comprises springs 108 which press on the top sides of the sector 107, insulating pads 109 being provided therebetween. The springs are carried by bushings 110 secured on adjusting screws 111 threaded in fixed arms 112 protruding from the tubular member 65, the screws 111 being held in adjusted position by lock nuts 113. The manifold sector 107 is made of a material which is a good electrical conductor, such as copper, brass or other known materials which are suitable for this purpose.

In FIG. 1 the protective gas supply is indicated at G and the electrical supply, both starting and welding, is indicated at E. A gas supply conduit G is shown in FIG. 3 but it is not believed to be necessary to show more of these auxiliaries. Welding current supply means and controls are well known and so are high frequency current supply means. Herein it will be assumed that the high frequency starting current will be maintained at all times so that the welding current will be re-established at any time if it should cease for any cause.

As shown in FIG. 1 the manifold sector is channeled to supply gas to the electrode unit which is active for welding and preferably, as shown, for purging the unit which was last active and for clearing the next unit to be used. The electrode unit 85A which is in use, will be provided with the best gas supply; and at the same time the unit 85L is being purged; and the unit 85B is being cleaned and loaded with gas in preparation for welding.

For each electrode unit the head ring 82 is provided with a through-extending hole 116 and on the inner side a detent nozzle seat bushing 117 is threaded. The electrode unit will be described presently but it is to be understood that gas passes through the unit to the weld zone at the workpiece. A detent nozzle 118 is slidably mounted in the sector so as to be entered into a bushing seat or to be withdrawn to clear the ring assembly so it may be rotated. The end of the nozzle is tapered to fit the tapered seat in the bushing and is provided with holes 119 at a manifold passage to admit gas into its interior cavity. A sealing ring 120 prevents gas from flowing upwardly around the detent nozzle.

The detent nozzle 118 is provided with a washer 121 and a headed retaining screw 122 and is urged upward by a spring 123 engaging beneath the washer and seated in a counterbore above the guide hole for the nozzle body.

An insulator member 124, as of "nylon" is provided for pushing the nozzle down, the member 124 being carried by a pin 125 secured in the bifurcated end of a depressing lever 126. The lever is mounted on a pivot pin 127 carried by a bracket 128 secured, as by cap screws 129, to the upper interior side of the tubular member 65.

The inner end of the lever 126 is actuated by an arm 131 fast on a short shaft 132 mounted in a bearing of a bracket 133 and a bearing of a transverse member 134. The transverse member is secured, as by welding, at its ends within the member 65 and provides a bearing for the indexing shaft 91.

At its outer end the indexing shaft 91 is provided with an actuating cam 135 having a riser 135a adapted to engage an arm 136 fast on shaft 132. As here shown, the arms 136 and 131 are formed integrally with a common hub made fast on or rotatable on the shaft 132. The cam 135 and related parts actuate the detent nozzle to push it down at the end of the indexing movement of the head ring and before the entire electrode head 66 is brought down for making a weld. Specifically, as stated above, the piston rod 88 operates the indexing means on its upstroke and operates the detent nozzle to make the final exact adjustment on its downstroke.

Means are provided for limiting the upward movement of the detent nozzle 118 when the head ring is being turned, with adjustment to insure that it fully clears the head ring. As shown, a set screw 138 is threaded in the end of arm 131 and its headed end is arranged to engage the inner surface of the tubular member 65. A locknut 139 holds the screw 138 in adjusted position.

Figure 7:
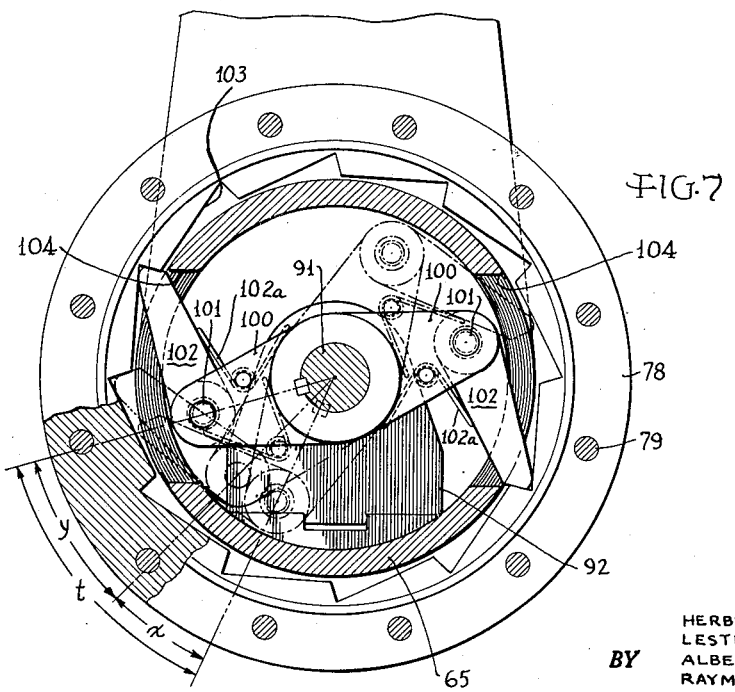
FIG. 7 is a vertical section taken on the line 7—7 of FIG. 4.

In FIGS. 5a, 6 and 7 the total angular travel of the indexing shaft 91 is designated at *t*; the angular travel (clockwise) to turn the head ring to shift electrode units is designated as *y*; and the angle of overtravel is designated as *x*, the detent being pushed down toward the end of the counterclockwise movement within the angle *x*. The actuation is by air pressure so no resilient means are needed for cushioning the action after the detent is fully seated.

The electrode unit, as shown in FIGS. 10, 11 and 12, includes a chuck holder 140 which is screwed into the head ring 82. A chuck 141 has its split tapered portion disposed in the tapered seat of the chuck holder and is pressed into gripping position to hold an electrode 142 (as of tungsten) by a spring 143 arranged between a flange 144 formed on the chuck and the bushing 117. The slots 145 between gripping elements of the chuck provide passages for the flow of gas to the space around the end of the electrode, the upper part of the chuck being tubular to allow gas to flow to the slots.

It will be evident that the chuck can be pushed inward from the outside against the spring and the electrode adjusted or exchanged. After positioning the spring action keeps the electrode in position. The parts are made of material which is a good conductor to provide good current flow from the head ring to the electrodes.

A gas-confining hood 148 is secured to the outer end of the chuck holder 140, as by being threaded to a projection 149 thereof within a surrounding flange 150; and the hood at its lower end, which seats on the workpiece, is provided with small transverse grooves 151 for the limited outflow of gas. The hood may be formed of a plastic, such as "nylon" or of a ceramic material. A ceramic known as "Surbraze M 120" has been found to give good results. The grooves are non-radial and staggered.

Within the ceramic hood and at the end there is provided a metal teaser ring 152, as of stainless steel, which acts with the high frequency current to establish and stabilize the position of the welding arc. This ring and its function constitute the subject matter of the copending application of Lester T. Bowers, Serial No. 57,922, filed Sept. 23, 1960, now Patent No. 3,015,022, dated December 26, 1961.

In operation, the head ring is turned while the head is in raised position to bring an electrode unit in the lowermost or active position. It will be assumed that the manifold will be continuously supplied with protective gas and high frequency current. The electrode unit which is in active ready position and a unit on each side are being supplied with protective gas and high frequency current. The unit which has last been used will be purged and cooled and the unit next to be used will be cleared ready for use.

On the return or down stroke of the crank arm the tubular detent will be brought down to finally adjust the active ready unit precisely and to supply gas to the space within the hood.

The head will be brought down to engage the hood at the active ready unit with the workpiece in welding position and the timer and contactor will be operated to apply welding current to the welding unit in welding position. The spark will be quickly and accurately established because of the pre-conditioning by high frequency current and the teaser ring. The supply of high frequency current and protective gas is continued during the welding operation.

During the welding the table and workpiece move linearly and this causes the head and frame to swing about the supporting axis at the piston rods.

After a weld has been made the head is raised and this allows the spring to return the head frame to initial position.

The apparatus greatly prolongs the life of the electrodes and insulating hoods as compared to using a single welding unit constantly to make every weld in a line. Beyond this, each unit has a far greater life without electrode reshaping than is possible when the touch-start procedure is used. In the latter case it is necessary to reshape electrodes about every 100 welds; in the present cast electrodes have been used to give good welds without redressing up to 10,000 in succession. The other proposals for starting by high frequency current, so far as known, are so uncertain as to making any weld at all consistently that there is no evidence that they are being used commercially.

It is thus seen that the invention provides a highly dependable, durable and efficient arc welder which can be depended upon to start and maintain the welding arc and assure that it is precisely located in the correct position. When electrodes need dressing, adjusting or replacing, this can be quickly accomplished by working from the outside of the electrode head ring.

While on embodiment of the invention has been described for purposes of illustration it is to be understood that there may be various embodiments and modifications within the general scope of the invention.

What is claimed is:

1. Arc spot welding apparatus, comprising in combination, a plurality of electrode units, means supporting the electrode units and providing movement of each electrode unit successively into a ready-for-welding position, means for moving electrode units in succession from ready-for-welding into welding position at a workpiece, and means for supplying inert protective gas and welding current to the electrode unit which is in welding position.

2. Arc spot welding apparatus, comprising in combination, a rotary support, a plurality of electrode units mounted on said support, means for shifting said rotary support to bring electrode units successively to a ready-for-welding position, means for moving said support and the electrode units thereon to bring the unit which is in the ready-for-welding position into welding position at the workpiece, and means for supplying inert protective gas and welding current to the electrode unit which is in welding position.

3. Arc spot welding apparatus, comprising in combination, a rotary support, a plurality of arc welding electrode units mounted on said support, means to bring electrode units successively into ready-for-welding position on said support, means for moving the support and the electrode units thereon to bring the electrode which is in the ready-for-welding position into welding position at a workpiece, a frame carrying said rotary support mounted to move in a direction to permit an electrode unit and workpiece to move along together while a weld is being made, and means for supplying inert protective gas and welding current to the electrode unit which is in welding position.

4. Arc spot welding apparatus, comprising in combination, a rotary electrode support, a plurality of electrode units mounted on said support, each unit including an electrode and a surrounding insulating hood, means for moving the support to bring electrode units successively into a ready position adjacent a workpiece, means for supplying high frequency starting current and protective gas to an electrode in the ready position, means for producing relative movement between a workpiece and an electrode unit at the ready position to bring the unit and the workpiece together in welding position, and means for supplying welding current to the electrode unit while in welding position to make a weld.

5. Apparatus as set forth in claim 4, in which the gas supply means and high frequency starting current supply means are constructed and arranged to supply protective gas and high frequency current throughout the entire time the weld is being made.

6. Arc spot welding apparatus, comprising in combination, a rotary electrode support, a plurality of electrode units mounted on said support adapted to be brought into an active position for welding, a manifold engaging said support and providing means for supplying high frequency starting current, welding current and protective gas to an electrode unit when in the active position, and means for bringing the electrode unit in the active position and a workpiece together to make a weld.

7. Arc spot welding apparatus as set forth in claim 6, wherein said manifold is provided with means for supplying protective gas to an electrode unit which is in a position adjacent the unit which is in active position.

8. Arc spot welding apparatus as set forth in claim 6, wherein said manifold is provided with means for supplying protective gas to an electrode unit on each side of the unit which is in active position.

9. Arc spot welding apparatus, comprising in combination, a base, means for moving a workpiece along relative to said base, a shiftable electrode support mounted on said base, a plurality of electrode units movably mounted on said support, means for moving said electrode units on said support to successively bring one of said electrode units into an active position on said support and there holding it fixed relative to said support in preparation for making a weld, means for moving said support and workpiece relatively to bring the electrode unit at the active position into welding position, the electrode unit support and workpiece moving together without relative movement between the electrode unit and support and the shiftable electrode support shifting in position relative to said base while a weld is being made, and means for returning the support to initial position after a weld has been made.

10. Apparatus as set forth in claim 9, wherein said support is mounted on said base to swing about an axis parallel to the axis of the active electrode unit when the electrode moves with the workpiece.

11. Arc spot welding apparatus comprising in combination, a support, an electrode mounting ring rotatably mounted on said support, a plurality of electrode units mounted on said ring, each unit comprising an electrode and an insulating gas hood mounted at a through opening in said ring, means to turn said ring in steps to bring an electrode unit into approximate active position, a manifold carried by said support for supplying protective gas to said unit at the active position, and a tubular detent engageable with the opening in the ring at the active position for bringing the unit into accurate position and for supplying gas to the hood at the electrode.

12. Apparatus as set forth in claim 11, in which said manifold is mounted to ride against said ring, means resiliently pressing the ring and manifold together, and electrical connections to said manifold for providing starting high frequency current and welding current to said electrode unit at the active position.

13. Apparatus as set forth in claim 11, in which said manifold is formed and arranged to supply a plurality of adjacent electrode units with protective gas and starting high frequency current.

References Cited in the file of this patent
UNITED STATES PATENTS

| | | |
|---|---|---|
| 1,097,895 | Thomson | May 26, 1914 |
| 1,999,617 | Randall | Apr. 30, 1935 |
| 2,829,238 | Hackman | Apr. 1, 1958 |